US012693390B2

(12) United States Patent
Lim

(10) Patent No.: US 12,693,390 B2
(45) Date of Patent: Jul. 28, 2026

(54) IMAGE SENSOR AND DISTANCE MEASURING SENSOR

(71) Applicant: Samsung Electronics Co., Ltd., Suwon-si (KR)

(72) Inventor: Jung Wook Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 871 days.

(21) Appl. No.: 18/065,841

(22) Filed: Dec. 14, 2022

(65) Prior Publication Data
US 2023/0194682 A1     Jun. 22, 2023

(30) Foreign Application Priority Data

Dec. 21, 2021     (KR) ......................... 10-2021-0183605
Nov. 21, 2022     (KR) ......................... 10-2022-0156492

(51) Int. Cl.
*G01S 7/4863*          (2020.01)
*G01S 7/486*           (2020.01)
*G01S 17/894*          (2020.01)

(52) U.S. Cl.
CPC .......... *G01S 7/4863* (2013.01); *G01S 7/4868* (2013.01); *G01S 17/894* (2020.01)

(58) Field of Classification Search
CPC ...... G01S 7/4863; G01S 7/4865; G01S 17/10; G01S 17/894; G01S 7/4914; G01S 7/4816; G01S 7/5202; G01S 15/8927; G01S 17/42; G01S 19/14; G01S 15/8925; G01S 7/4868; G01S 7/4817; G01S 11/12; G01S 5/16; G01S 17/14; G01S 7/483;

G01S 7/4861; G01S 13/08; G01S 15/08; G01S 15/88; G01S 17/08; G01S 17/46; G01S 17/88; G01S 19/24; G01S 7/481; G01S 7/4813; G01S 7/4815; H10F 39/014; B60N 2210/20; B60N 2210/24; B60Q 9/008;
(Continued)

(56) References Cited

U.S. PATENT DOCUMENTS 8,946,617 B2     2/2015   Holz et al.
9,386,242 B2     7/2016   Nam
(Continued)

FOREIGN PATENT DOCUMENTS

JP          2000-260971 A     9/2000
JP          3590158 B2        11/2004
WO     WO-2022089069 A1 *  5/2022   ............. H10F 39/12

*Primary Examiner* — Sanjiv D. Patel
(74) *Attorney, Agent, or Firm* — Fish & Richardson P.C.

(57) ABSTRACT

A distance measuring sensor of an image sensor includes a light emitter configured to output a first optical signal, a pixel array configured to receive a second optical signal caused by reflection of the first optical signal from an object, processing circuitry configured to calculate a distance between the light emitter and the object based on an output of the pixel array, and a variable voltage source, and the processing circuitry is further configured to, control the variable voltage source to apply a first voltage to a first node in response to the calculated distance between the light emitter and the object being larger than a first threshold distance, and control the variable voltage source to apply no voltage to the first node in response to the calculated distance between the light emitter and the object being smaller than the first threshold distance.

19 Claims, 15 Drawing Sheets

(58) Field of Classification Search
CPC ........ B60Q 1/50; B60Q 1/346; B60R 21/013; B60R 21/0134; G06F 2203/04101; G06F 3/041; G06F 1/3262; G06F 1/3265; G06F 3/0412
See application file for complete search history.

(56)                          References Cited

U.S. PATENT DOCUMENTS

| | | | |
|---|---|---|---|
| 9,743,022 B2 | 8/2017 | Oh et al. | |
| 10,283,539 B2 | 5/2019 | Fossum et al. | |
| 10,714,517 B2 | 7/2020 | Lee et al. | |
| 10,734,434 B2 | 8/2020 | Zheng et al. | |
| 11,039,521 B1 | 6/2021 | Huang et al. | |
| 11,614,526 B1 * | 3/2023 | Li | G01S 7/484 |
| | | | 356/4.01 |
| 2020/0174133 A1 | 6/2020 | Jin et al. | |
| 2020/0309915 A1 | 10/2020 | Beuschel et al. | |
| 2021/0041541 A1 | 2/2021 | Sadhu et al. | |
| 2021/0144325 A1 * | 5/2021 | Jin | H04N 25/77 |
| 2022/0011437 A1 * | 1/2022 | Koyama | G01S 7/4861 |

* cited by examiner

| $P(i, j)$ | $P(i, j+1)$ | $P(i, j+2)$ |
|-----------|-------------|-------------|
| $P(i+1, j)$ | $P(i+1, j+1)$ | $P(i+1, j+2)$ |
| $P(i+2, j)$ | $P(i+2, j+1)$ | $P(i+2, j+2)$ |

IMAGE SENSOR AND DISTANCE MEASURING SENSOR

CROSS-REFERENCE TO RELATED APPLICATION

This application claims the benefit of priority under 35 U.S.C. § 119 to Korean Patent Application Nos. 10-2021-0183605, filed on Dec. 21, 2021 and No. 10-2022-0156492, filed on Nov. 21, 2022, in the Korean Intellectual Property Office, the disclosure of each of which are incorporated herein in their entireties by reference.

BACKGROUND

Various example embodiments of the inventive concepts relate to an image sensor, a distance measuring sensor, a system including the image sensor and/or the distance measuring sensor, and/or methods of operating the image sensor and/or operating the distance measuring sensor, etc.

With the widespread use of digital cameras, digital video cameras, and mobile phones including functions thereof, image sensors are rapidly developing. The image sensor is a semiconductor device that converts an optical image into an electrical signal. Research is also being actively conducted on a three-dimensional (3D) image sensor, that is, a distance sensor (e.g., depth sensor), which may simultaneously capture a two-dimensional image (2D image) and a depth image, in response to a demand for a stereoscopic image.

SUMMARY

Various example embodiments of the inventive concepts provide for an image sensor in which an image quality is enhanced and complexity is improved.

Various example embodiments of the inventive concepts also provide a distance measuring sensor in which an image quality is enhanced and complexity is improved.

However, aspects of the example embodiments of the inventive concepts are not restricted to the one set forth herein. The above and other aspects of the example embodiments will become more apparent to one of ordinary skill in the art to which the inventive concepts pertain by referencing the detailed description of the example embodiments given below.

According to at least one example embodiment, there is provided a distance measuring sensor comprising a light emitter configured to output a first optical signal, a pixel array configured to receive a second optical signal caused by reflection of the first optical signal from an object, processing circuitry configured to calculate a distance between the light emitter and the object based on an output of the pixel array, and a variable voltage source, and the pixel array includes, a photo diode including a first end connected to a ground voltage and a second end connected to a first node, and a first photo gate and a second photo gate, each connected to the first node, and the processing circuitry is further configured to, control the variable voltage source to apply a first voltage to the first node in response to the calculated distance between the light emitter and the object being larger than a first threshold distance, and control the variable voltage source to apply no voltage to the first node in response to the calculated distance between the light emitter and the object being smaller than the first threshold distance.

According to at least one example embodiment, there is provided an image sensor comprising a first pixel which includes a plurality of first photo gates and a plurality of first photo diodes below the plurality of first photo gates, a second pixel which includes a plurality of second photo gates and a plurality of second photo diodes below the plurality of second photo gates, a switch which is separated from the first and second pixels and connected between the first and second photo diodes and a voltage source, and the switch being configured to, apply a voltage to the first and second photo diodes in a first switch mode, and not apply a voltage to the first and second photo diodes in a second switch mode, and the first and second photo diodes are configured to output a larger amount of charges in response to the applied voltage than in response to no applied voltage.

According to at least one example embodiment, there is provided a distance measuring sensor comprising a light emitter configured to output a first optical signal, a pixel array configured to receive a second optical signal caused by reflection of the first optical signal from an object, processing circuitry configured to calculate a distance between the light emitter and the object from an output of the pixel array, and a variable voltage source, wherein the pixel array includes, a photoelectric conversion unit that includes a substrate and a doping region, the substrate being doped with a first impurity and which has a ground voltage, and the doping region being doped with a second impurity different from the first impurity, and the photoelectric conversion unit is configured to convert the second optical signal into an electric signal, and a photo gate on the doping region and connected to the doping region, wherein the processing circuitry is further configured to determine whether the calculated distance corresponds to a first distance mode or a second distance mode, the second distance mode is farther away than the first distance mode, control the variable voltage source to apply a first voltage to the doping region in the first distance mode, and control the variable voltage source to apply a second voltage to the doping region in the second distance mode, the second voltage having a higher level than the first voltage.

BRIEF DESCRIPTION OF DRAWINGS

The above and other aspects will become more apparent by describing in detail various example embodiments of the inventive concepts with reference to the attached drawings, in which:

FIG. 2 is an example diagram for explaining the arrangement of the pixel array according to some example embodiments.

FIG. 7 is a graph showing a current change depending on the voltage of the photo diode according to at least one example embodiment.

FIGS. 8 and 9 are timing diagrams showing the signal for driving the first pixel region according to some example embodiments.

DETAILED DESCRIPTION

Hereinafter, various example embodiments according to the inventive concepts will be described referring to the accompanying drawings.

Figure 1:
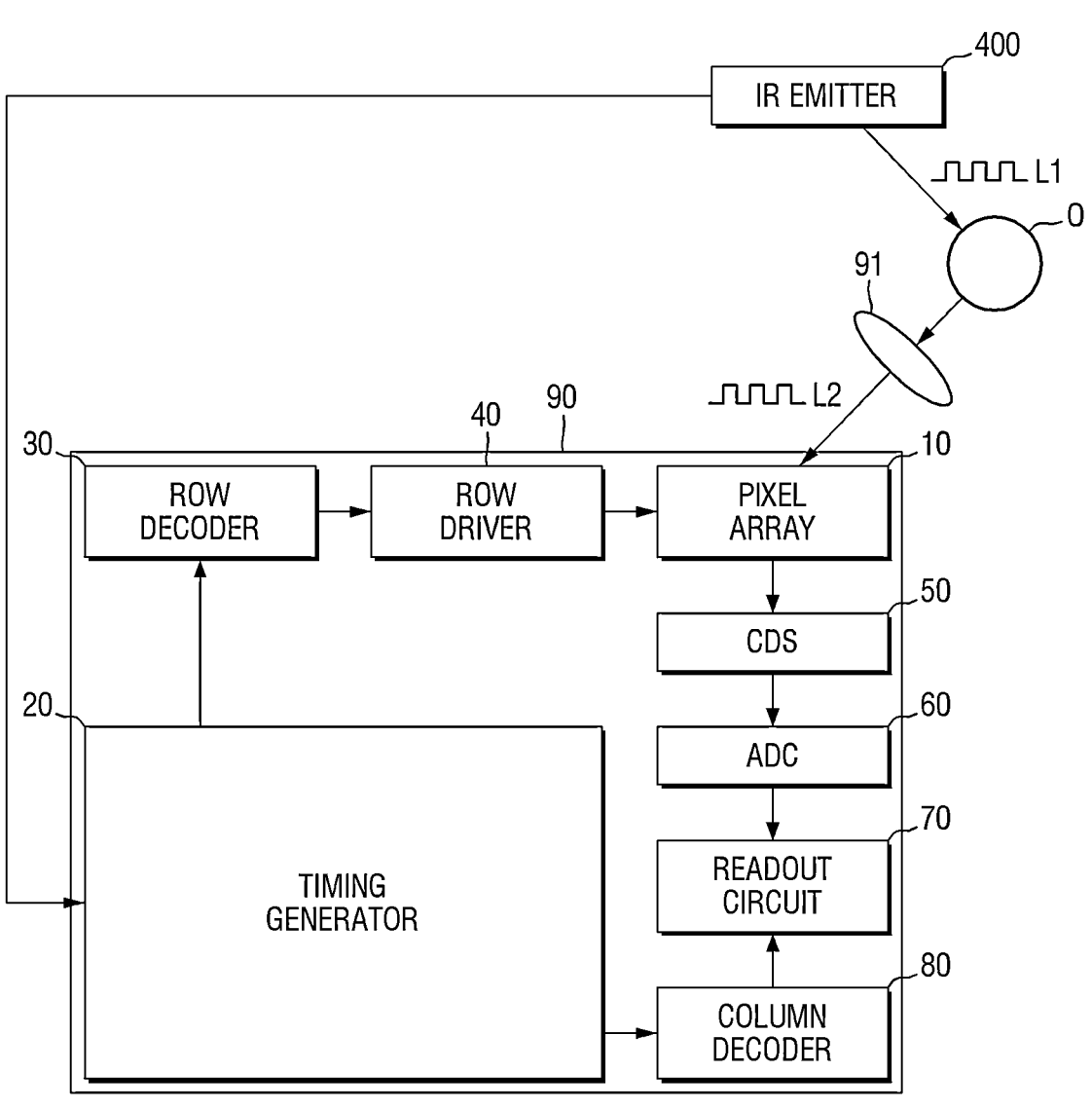
FIG. 1 is a block diagram of a distance measuring sensor according to some example embodiments.

FIG. 1 is a block diagram of a distance measuring sensor according to some example embodiments.

Referring to FIG. 1, a distance measuring sensor 1 according to some example embodiments of the inventive concepts may include at least one light output unit 400 and/or an image sensor 90, but the example embodiments are not limited thereto, and for example, the distance measuring sensor 1 may include a greater or lesser number of constituent components. The light output unit 400 (e.g., a light emitter) may irradiate an object O with at least a first optical signal L1. The first optical signal L1 may be, for example, infrared rays, a laser light pulse, etc., but is not limited thereto. The first optical signal L1 is reflected by the object O, and may be provided to the image sensor 90 as a second optical signal (e.g., a reflected light signal, etc.) L2 through at least one lens 91, etc. The light output unit 400 may transfer information about the first optical signal L1 to the image sensor 90. For example, the light output unit 400 may provide information, such as distance information and/or timing information, related to and/or about the first optical signal L1 to a timing generator 20, etc., but the example embodiments are not limited thereto.

For example, the image sensor 90 (e.g., processing circuitry of the image sensor 90, etc.) may analyze, calculate, and/or determine the distance information between the light output unit 400 and the object O, using the second optical signal L2. Specifically, the image sensor 90 may include a pixel array 10, a timing generator 20, a row decoder 30, a row driver 40, a correlated double sampler (CDS) 50, an analog-digital converter (ADC) 60, a readout circuit 70, and/or a column decoder 80, and the like, but the example embodiments are not limited thereto. According to some example embodiments, the timing generator 20, row decoder 30, row driver 40, CDS 50, ADC 60, readout circuit 70, and/or column decoder 80, etc., may be implemented as processing circuitry. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixel array 10 may include a plurality of pixels arranged two-dimensionally, but is not limited thereto. The plurality of pixels may serve to convert an optical image (e.g., an optical signal, a reflected light signal, a photoelectric signal, etc.) into an electrical output signal. The pixel array 10 may receive the second optical signal L2 through the lens 91, but is not limited thereto. The pixel array 10 may be driven by receiving a plurality of drive signals such as a row selection signal, a reset signal, a transfer signal, a photo gate drive signal, and/or an overflow gate drive signal, etc., from the row driver 40. Further, the converted electrical output signal may be provided to, for example, the correlated double sampler (CDS) 50 through a vertical signal line, etc.

The timing generator 20 may provide and/or generate a timing signal and/or a control signal to the row decoder 30 and/or the column decoder 80, etc. The timing generator 20 according to some example embodiments may receive and/or determine information about and/or corresponding to the first optical signal L1 from the light output unit 400. The timing generator 20 may generate a photo gate drive signal, for example, on the basis of information about and/or determine from the first optical signal L1. For example, the timing generator 20 may generate a first signal PG1_S (FIG. 8) having the same phase as the first optical signal L1, and a second signal PG2_S (FIG. 8) having a phase opposite to the first optical signal L1 (e.g., the second signal PG2_S has a phase with a difference of 180 degrees from the first optical signal L1, etc.), and provide them to the row decoder 30, but the example embodiments are not limited thereto. A specific explanation will be provided later.

The row decoder 30 may receive a timing signal and/or a control signal, etc., from the timing generator 20, and control addressing and/or scanning timing for each row of the pixel array 10 based on the timing signal and/or the control signal, etc.

The row driver 40 may provide the pixel array 10 with a plurality of drive signals for driving a plurality of unit pixels according to and/or based on the result decoded by the row decoder 30. In general, when unit pixels are arranged in a matrix, the drive signal may be provided for each row, but the example embodiments are not limited thereto.

The correlated double sampler 50 may receive the output signal generated in the pixel array 10 through the vertical signal line and may store and/or hold and sample the output signal, etc. That is, the correlated double sampler 50 may doubly sample (e.g., sample twice) the specific noise level and/or the signal level of the output signal and/or due to the output signal, and output a difference level corresponding to the difference between the noise level and the signal level, etc.

The analog-digital converter (ADC) 60 may convert an analog signal corresponding to the calculated difference level into a digital signal and output the digital signal to the readout circuit 70, but is not limited thereto.

The readout circuit 70 may perform image processing on the digital signal in the column decoder 80 according to and/or based on the decoding result. The readout circuit 70 may process the digital signal to derive, calculate, and/or generate distance information, or the like, of the image. That is, the readout circuit 70 may calculate the distance information between the object O and the light output unit 400 and/or the image sensor 90 based on the signal output from the pixel array 10.

FIG. 2 is an example diagram for explaining the arrangement of the pixel array according to some example embodiments.

Referring to FIG. 2, according to at least one example embodiment, a plurality of pixels may be aligned in rows and columns in the pixel array 10, but are not limited thereto. In FIG. 2, pixels located in an i-row and a j-column are represented by P(i, j). Although FIG. 2 shows only three rows and three columns for the sake of brevity and convenience, the example embodiments are not limited thereto. That is, the number of rows and columns may vary.

Although a horizontal shape of a first pixel region P(i, j) may be square, the example embodiments are not limited thereto, and for example, the pixel regions may have other shapes, shapes such as circular, oval, rectangular, polygonal, etc. The first pixel region P(i, j) may be placed to be in contact with an adjacent second pixel region P(i, j+1) on the square surface, etc.

Figure 3:
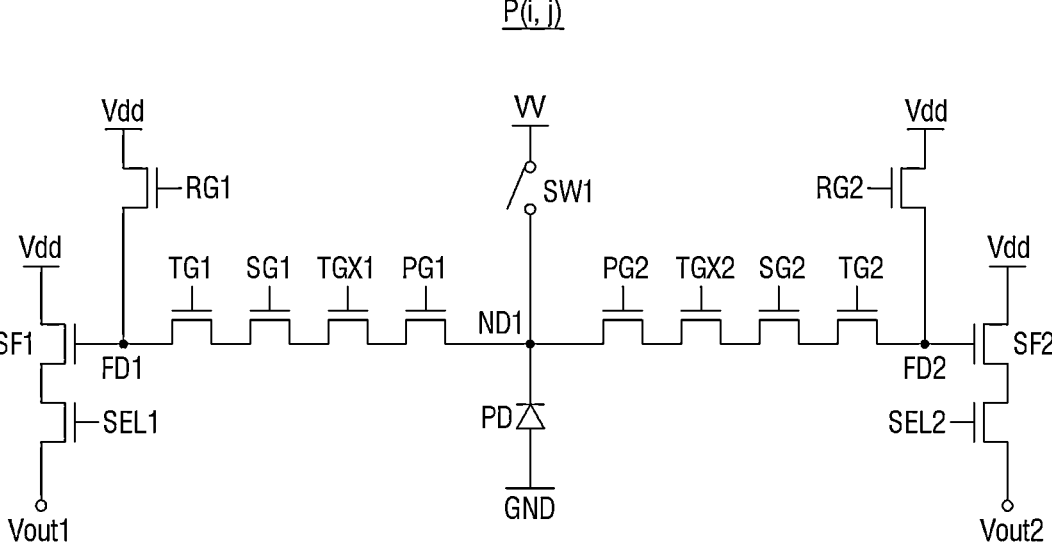
FIG. 3 is an equivalent circuit diagram of the first pixel region according to some example embodiments.
Figure 4:
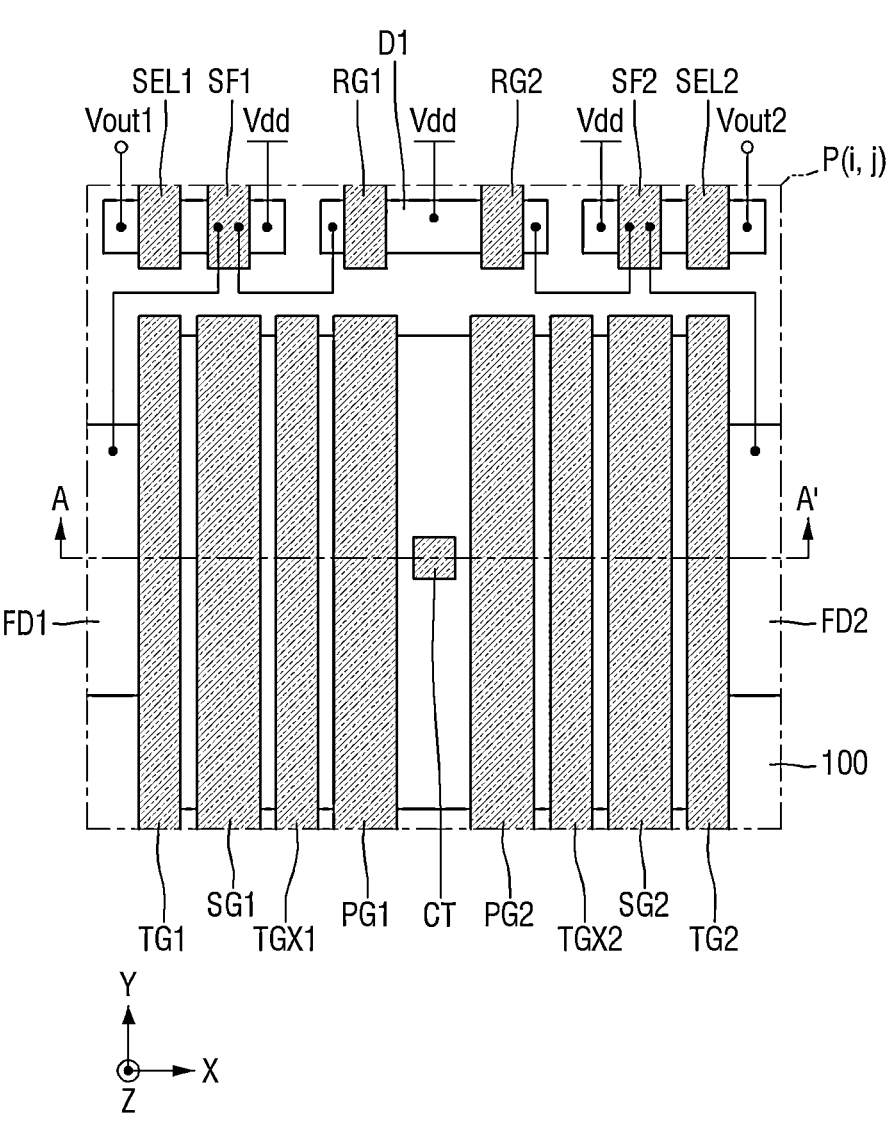
FIG. 4 is a layout diagram of the first pixel region according to some example embodiments.
Figure 5:
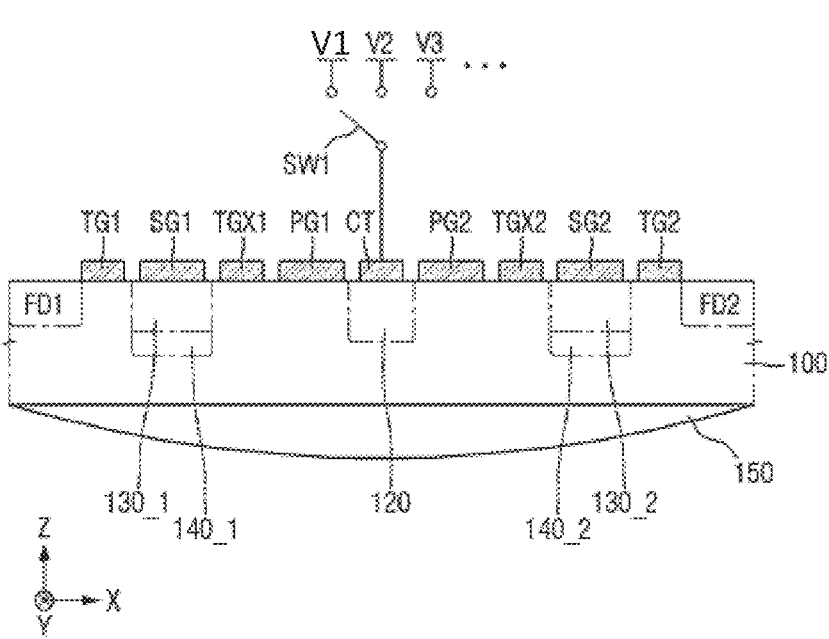
FIG. 5 is a cross-sectional view taken along a line A-A' of FIG. 4 according to at least one example embodiment.

FIG. 3 is an equivalent circuit diagram of the first pixel region according to some example embodiments. FIG. 4 is a layout diagram of the first pixel region according to some example embodiments. FIG. 5 is a cross-sectional view taken along a line A-A' of FIG. 4 according to at least one example embodiment.

Referring to FIGS. 3 to 5, according to some example embodiments, the first pixel region P(i, j) may include a substrate 100, a first photo gate PG1, a second photo gate PG2, a first collected charge transfer gate TGX1, a second collected charge transfer gate TGX2, a first storage gate SG1, a second storage gate SG2, a first transfer gate TG1, a second transfer gate TG2, a first reset gate RG1, a second reset gate RG2, a first source follower gate SF1, a second source follower gate SF2, a first selection gate SEL1, a second selection gate SEL2, a first switch SW1 and/or at least one microlens 150, etc., but the example embodiments are not limited thereto, and for example, the pixel region P(i, j) may include a greater or lesser number of constituent elements. As used herein, the term "gate" may mean a gate of the transistor. For example, the first selection gate SEL1 means a gate of the first selection transistor.

A plurality of gates according to some example embodiments may be formed on a first side of the substrate 100, but is not limited thereto. The microlens 150 may be formed on a second side opposite to the first side of the substrate 100, but is not limited thereto. However, the example embodiments are not limited thereto, and the plurality of gates and the microlens 150 may be formed on the same side of the substrate 100, etc. Further, the plurality of gates according to some example embodiments may each include an interface film, a gate insulating film, and/or a gate electrode, etc.

As the substrate 100, for example, a p-type or n-type bulk substrate may be used, a p-type or n-type epitaxial layer may be used by being grown on the p-type bulk substrate, or the p-type or n-type epitaxial layer may be used by being grown on the n-type bulk substrate. However, the example embodiments are not limited thereto. For example, as the substrate 100, a Si bulk substrate may be used, or a substrate such as an organic plastic substrate may also be used in addition to the semiconductor substrate, etc. The substrate 100 may be formed of p-type impurities or n-type impurities.

The microlens 150 may be made of an organic material such as PR (photoresist). However, the example embodiments of the inventive concepts are not limited thereto, and the microlens 150 may be formed, for example, of an inorganic material, etc. Formation of the microlens 150 with the organic material may be, for example, a process of forming an organic material pattern on the substrate 100 and performing a thermal process to form the microlens 150. The organic material pattern may be changed to the form of the microlens 150 by the thermal process.

The first photo gate PG1, the first collected charge transfer gate TGX1, the first storage gate SG1, the first transfer gate TG1, the first reset gate RG1, the first source follower gate SF1 and/or the first selection gate SEL1, etc., may be placed symmetrically (e.g., mirror symmetrically) across from the second photo gate PG2, the second collected charge transfer gate TGX2, the second storage gate SG2, the second transfer gate TG2, the second reset gate RG2, the second source follower gate SF2, and the second selection gate SEL2, on the basis of and/or in relation to the node ND1, but the example embodiments are not limited thereto.

According to some example embodiments, the first photo gate PG1 and the second photo gate PG2 may be placed apart from each other in a first direction X, but are not limited thereto. Further, the first photo gate PG1 and the second photo gate PG2 may extend in a second direction Y, respectively, but are not limited thereto.

A charge collection region 120 may be formed inside the substrate 100 below an area between the first photo gate PG1 and the second photo gate PG2 along a direction in which the first photo gate PG1 and the second photo gate PG2 extend, that is, along the second direction Y. The charge collection region 120 may receive light (e.g., the second optical signal L2) from the microlens 150 to generate charges (e.g., electrical charges, current, electric signal, etc.). In other words, the charge collection region 120 may convert the optical signal received through the microlens 150 into an electric signal.

The charge collection region 120 and the substrate 100 may form a PN junction. The charge collection region 120 and the substrate 100 may correspond to a photo diode PD, for example, a photoelectric conversion unit.

The contact CT may be disposed between the first photo gate PG1 and the second photo gate PG2. The contact CT may be connected to the first switch SW1.

The contact CT may contact to the charge collection region 120. That is, the first switch SW1 may be connected to the charge collection region 120 and the photo diode PD formed in the substrate 100 through the contact CT, but is not limited thereto. A variable voltage VV may be applied to the charge collection region 120 which is a portion of the photo diode PD through the first switch SW1. That is, the first switch SW1 may directly connect the variable voltage VV to the photo diode PD. The variable voltage VV may be applied to the charge collection region 120 of the photo diode PD when the first switch SW1 is turned on, and the variable voltage VV may not be applied to the charge collection region 120 of the photo diode PD when the first switch SW1 is turned off.

The voltage applied to the charge collection region 120 of the photo diode PD through the first switch SW1 may be changed and/or adjusted, etc. That is, when the turn-on voltage is applied to the first switch SW1, the variable voltage VV may be applied to the charge collection region 120 of the photo diode PD. When a turn-off voltage (e.g., a ground voltage) is applied to the first switch SW1, the first switch SW1 is turned off, and the variable voltage VV may not be applied to the charge collection region 120 of the photo diode PD. The corresponding operation may be implemented by the timing generator 20, or in other words, the first switch SW1 is controlled by the timing generator 20, but the example embodiments are not limited thereto. For example, the variable voltage VV may be changed according to a control signal generated by the timing generator 20. For example, the variable voltage VV may be one of a plurality of voltages V1, V2, V3 of FIG. 5. For example, the variable voltage VV may be a power supply voltage Vdd, a ground voltage GND, +10V or −10V, but the example embodiments are not limited thereto, and for example, other desired voltages may be used, etc.

The first collected charge transfer gate TGX1 is separated from the first photo gate PG1 in the first direction X, and may extend in the second direction Y, etc. The first collected charge transfer gate TGX1 may provide the charges generated in the charge collection region to the first storage region 130_1 according to and/or based on the control signal. Since the second collected charge transfer gate TGX2 is similar to and/or the same as the first collected charge transfer gate TGX1, the description thereof will be omitted.

The first storage gate SG1 is separated from the first collected charge transfer gate TGX1 in the first direction X, and may extend in the second direction Y, etc. The first storage region 130_1 and the first barrier region 140_1 may be formed inside the substrate 100 below the first storage gate SG1 along the direction in which the first storage gate SG1 extends, that is, the second direction Y, but is not limited thereto. Depending on the control signal provided to the first storage gate SG1, the first storage region 130_1 may temporarily store the charges provided from the charge collection region 120, etc. The first barrier region 140_1 is formed below the first storage region 130_1, blocks optical signals provided from the outside of the first storage region 130_1, and may decrease, reduce, and/or minimize the external influence of the charges stored in the first storage region 130_1. In other words, the first barrier region 140_1 may decrease, reduce, and/or prevent the first storage region 130_1 from generating the charges by an external optical signal. The first barrier region 140_1 according to some example embodiments may include p-type impurities, but is not limited thereto. Although the first storage region 130_1 according to some example embodiments may include n-type impurities, the example embodiments are not limited thereto. For example, the first storage region 130_1 may not include n-type impurities (e.g., may be undoped, etc.). When the first storage region 130_1 according to some example embodiments includes n-type impurities and the first barrier region 140_1 includes p-type impurities, the first storage region 130_1 which is an n-type semiconductor and the first barrier region 140_1 which is a p-type semiconductor may form a storage diode (SD).

The second storage gate SG2 is separated from the second collected charge transfer gate TGX2 in the first direction X, and may extend in the second direction Y, etc. The second storage region 130_2 and the second barrier region 140_2 may be formed inside the substrate 100 below the second storage gate SG2, but is not limited thereto. Because the second storage gate SG2, the second storage region 130_2, and the second barrier region 140_2 are each similar to and/or the same as the first storage gate SG1, the first storage region 130_1, and the first barrier region 140_1, the description thereof will be omitted.

In some example embodiments, a person of ordinary skill in the art would understand that one or more of the first collected charge transfer gate TGX1, the second collected charge transfer gate TGX2, the first storage gate SG1, and/or the second storage gate SG2 may be omitted in at least one example embodiment of the inventive concepts.

The first transfer gate TG1 is separated from the first storage gate SG1 in the first direction X and may extend in the second direction Y, etc. The first transfer gate TG1 may provide and/or output the charges temporarily stored in the first storage region 130_1 to the first floating diffusion region FD1. The charges provided to the first floating diffusion region FD1 may be output as a first output voltage Vout1 through the first source follower gate SF1 and the first selection gate SEL1, etc. The first reset gate RG1 may reset the first floating diffusion region FD1 to the power supply voltage Vdd, or in other words, the first reset gate RG1 may transmit the Vdd to the first floating diffusion region FD1 to reset the first floating diffusion region FD1, etc.

The second transfer gate TG2 is separated from the second storage gate SG2 in the first direction X, and may extend in the second direction Y, etc. The second transfer gate TG2 may provide and/or transmit the charges temporarily stored in the second storage region 130_2 to the second floating diffusion region FD2, but is not limited thereto. The charges provided to the second floating diffusion region FD2 may be output as the second output voltage Vout2 through the second source follower gate SF2 and the second selection gate SEL2, etc. The second reset gate RG2 may reset the second floating diffusion region FD2 to the power supply voltage Vdd. According to some example embodiments, although the same power supply voltage Vdd is shown as being applied to the drains of the first drain region D1, the first source follower gate SF1 and the second source follower gate SF2, and the drains of the first reset gate RG1 and the second reset gate RG2, the example embodiments are not limited thereto. In some cases, different voltages may be applied to the drains of the first drain region D1, the first source follower gate SF1 and the second source follower gate SF2, and the drains of the first reset gate RG1 and/or the second reset gate RG2, etc.

Hereinafter, a plurality of image sensing methods of the distance measuring sensor 1 will be described referring to FIGS. 1 to 7.

Figure 6:
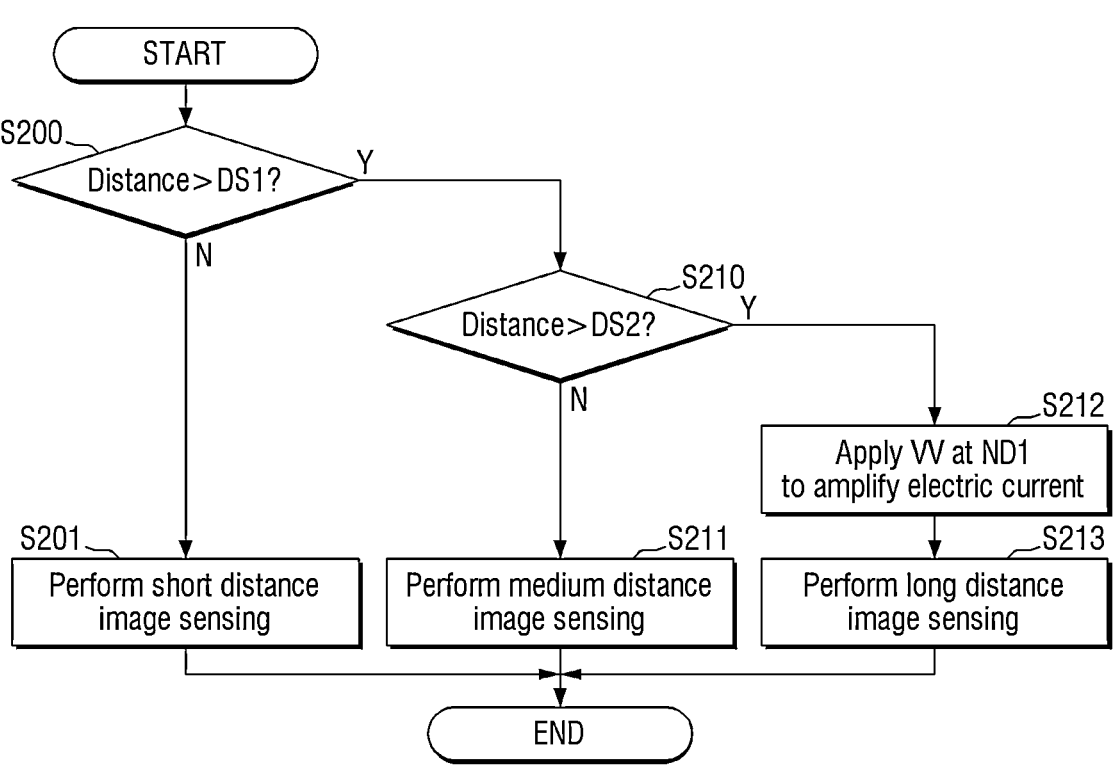
FIG. 6 is a flowchart explaining an image sensing method of the distance measuring sensor according to some example embodiments.
Figure 7:
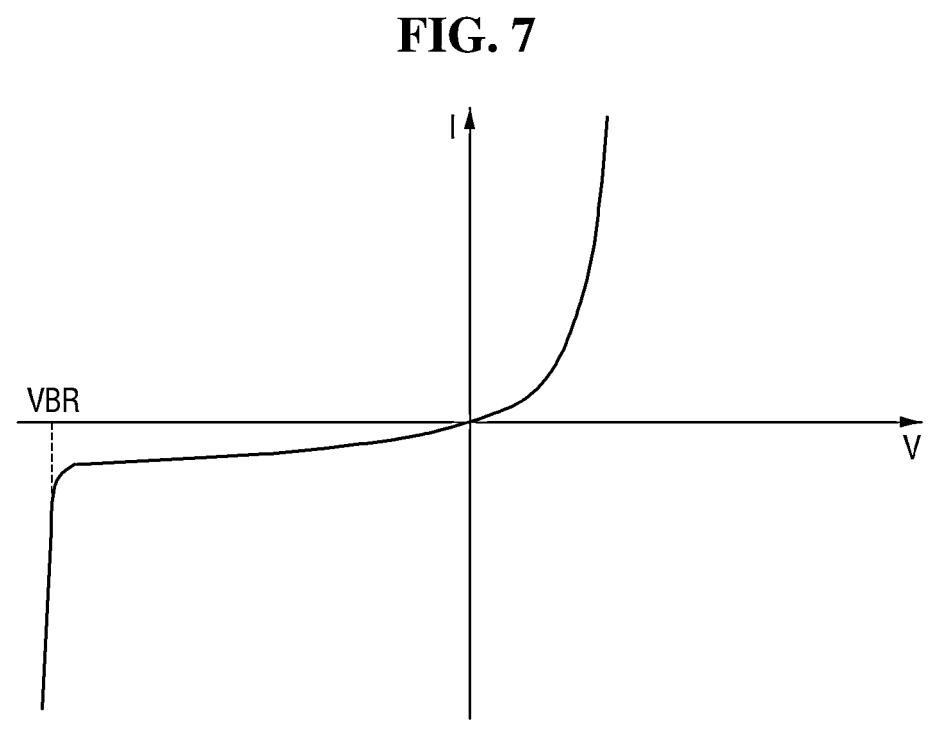

FIG. 6 is a flowchart explaining an image sensing method of the distance measuring sensor according to some example embodiments. FIG. 7 is a graph showing a current change depending on the voltage of the photo diode according to at least one example embodiment.

Referring to FIGS. 1, 3 and 6, the distance measuring sensor 1 may determine whether the distance to be measured is larger than a first distance DS1 (e.g., a desired first distance, a first threshold distance value, etc.) (S200). For example, the distance measuring sensor 1, e.g., the processing circuitry (and/or the readout circuit 70, etc.) of the distance measuring sensor 1, and/or a user of the distance measuring sensor 1 may determine whether the distance from the light output unit 400 to the object O determined and/or calculated using the signal output from the pixel array 10 is larger than the first distance DS1. As another example, when the distance measuring sensor 1 is used, the user may determine whether the distance from the light output unit 400 to the object O is larger than the first distance DS1 and manually select and/or change the image sensing mode of the image sensor based on the results of the distance determination, etc., but the example embodiments are not limited thereto. For example, although the first distance DS1 may correspond to, e.g., 1 m, but the example embodiment of the inventive concepts are not limited thereto, and greater or lesser threshold distance values may be used instead. The processing circuitry and/or the user may determine that the distance from the light output unit 400 to the object O is larger or smaller than the first distance DS1.

When the distance to be measured by the distance measuring sensor 1 is not larger than the first distance DS1 (S200—N), the processing circuitry (and/or the readout circuit 70, etc.) of the distance measuring sensor 1, and/or a user of the distance measuring sensor 1 of the distance measuring sensor 1 may control the distance measuring sensor 1 to set the image sensor to short distance image sensing mode and/or perform short distance image sensing (S201). For example, the short distance image sensing may correspond to image sensing used when measuring distances of, e.g., 1 m or less, but the example embodiments are not limited thereto, and the short distance measuring threshold distance may be greater or less than 1 m, etc. The distance measuring sensor 1 may measure the distance from the light output unit 400 to the object O located at a distance smaller than the first distance DS1. That is, the distance measuring sensor 1 may calculate a distance smaller than the first distance DS1 on the basis of the first optical signal L1, the second optical signal L2, the first signal PG1_S, and the second signal PG2_S, etc.

At this time, the first switch SW1 may be turned off by the distance measuring sensor 1 (e.g., the processing circuitry), etc. That is, the variable voltage VV may not be applied to the first node ND1, etc. Further, the charges generated from the photo diode PD may be converted into the first output voltage Vout1 and the second output voltage Vout2 and output.

When the distance to be measured by the distance measuring sensor 1 is larger than the first distance DS1 (S200—Y), the processing circuitry (and/or the readout circuit 70, etc.) of the distance measuring sensor 1, and/or a user of the distance measuring sensor 1 of the of the distance measuring sensor 1 may determine whether the distance to be measured is larger than a second distance DS2 (S210) (e.g., a desired second distance, a second threshold distance value, etc.). For example, the distance measuring sensor 1 may determine whether the distance from the light output unit 400 to the object O is larger than the second distance DS2 determined and/or calculated using the signal output from the pixel array 10. As another example, when the distance measuring sensor 1 is used, the user may determine whether the distance from the light output unit 400 to the object O is larger than the second distance DS2 and manually select and/or change the image sensing mode of the image sensor based on the results of the distance determination, but the example embodiments are not limited thereto. For example, in at least one example embodiment the second distance DS2 may correspond to 10 m, but the example embodiments of the inventive concepts are not limited thereto, and for example, other distance values greater than the first distance DS1 may be used as the second distance DS2. The user may determine that the distance from the light output unit 400 to the object O is larger or smaller than the second distance DS2.

When the distance to be measured by the distance measuring sensor 1 is not larger than the second distance DS2 (S210—N), the processing circuitry (and/or the readout circuit 70, etc.) of the distance measuring sensor 1, and/or a user of the distance measuring sensor 1 of the distance measuring sensor 1 may set the image sensor to medium distance image sensing mode and/or control the image sensor to perform medium distance image sensing (S211). For example, the medium distance image sensing may correspond to image sensing used when measuring the distances larger than the first distance value DS1, e.g., 1 m, and less than the second distance value DS2, e.g., 10 m, etc. The distance measuring sensor 1 may measure the distance from the light output unit 400 to the object O located at a distance larger than the first distance DS1 and smaller than the second distance DS2. That is, the distance measuring sensor 1 may calculate a distance larger than the first distance DS1 and smaller than the second distance DS2, on the basis of the first optical signal L1, the second optical signal L2, the first signal PG1_S, and the second signal PG2_S.

At this time, the first switch SW1 may be turned off by the distance measuring sensor 1 (and/or the processing circuitry, the readout circuit, etc.). That is, the variable voltage VV may not be applied to the first node ND1. Further, the charges generated from the photo diode PD may be converted into the first output voltage Vout1 and the second output voltage Vout2 and output, etc.

When the distance to be measured by and/or using the distance measuring sensor 1 is larger than the second distance DS2 (S210—Y), the distance measuring sensor 1 may apply the variable voltage VV to the first node ND1 (for example, the charge collection region 120 in FIG. 5) to amplify the current (S212). At this time, the first switch SW1 may be turned on by the distance measuring sensor 1, etc. Therefore, the variable voltage VV may be applied to the first node ND1. Here, the variable voltage VV may be applied to and/or transmitted to one end (e.g., the first end) of the photo diode PD. A ground voltage GND may be applied to and/or transmitted to the other end (e.g., the second end) of the photo diode PD. As a result, a voltage corresponding to a difference between the ground voltage GND and the variable voltage VV may be applied to and/or transmitted to both ends of the photo diode PD.

Referring to FIG. 7, the amount of charges generated may change as the variable voltage VV is applied to and/or transmitted to one end (e.g., the first end) of the photo diode PD. When the variable voltage VV increases, the amount of charges generated from and/or by the photo diode PD may gradually increase. When the variable voltage VV decreases, the amount of charges generated from and/or by the photo diode PD may be kept constant. However, when the variable voltage VV becomes larger than a breakdown voltage VBR of the photo diode PD, the amount of charges generated from and/or by the photo diode PD may be amplified. This is a phenomenon caused by an avalanche breakdown of the photo diode PD. That is, when the variable voltage VV becomes larger than the breakdown voltage VBR of the photo diode PD, the amount of charges generated from and/or by the photo diode PD may increase due to the avalanche breakdown.

For example, the amount of charges generated from and/or by the photo diode PD during the short distance image sensing operation and/or during the medium distance image sensing operation may be smaller than the amount of charges generated from and/or the photo diode PD during the long distance image sensing operation. Accordingly, the distance measuring sensor 1 may convert a small amount of received photons into a larger amount of charges. Therefore, the distance measuring sensor 1 is enabled to perform distance sensing over longer distances, or in other words, perform the long distance image sensing operation (S213). For example, the long distance image sensing may correspond to the image sensing used when measuring distances of greater than, e.g., 10 m, but the example embodiments are not limited thereto. In other words, the distance measuring sensor 1 may measure the distance from the light output unit 400 to the object O located at a distance larger than the second distance DS2. That is, the distance measuring sensor 1 may calculate a distance larger than the second distance DS2, on the basis of the first optical signal L1, the second optical signal L2, the first signal PG1_S, and the second signal PG2_S, etc.

In summary, the distance measuring sensor 1 may separately perform the short distance measuring sensing operation, the medium distance measuring sensing operation, and/or the long distance measuring sensing operation, etc. When the distance measuring sensor 1 performs the short distance and/or the medium distance measuring sensing, no voltage is applied to the first node ND1, and the distance measuring may be performed as in the existing case. However, when the distance measuring sensor 1 performs the long distance measuring sensing, the variable voltage VV is applied to the first node ND1 and the amount of charges generated from the photo diode PD may be amplified. Accordingly, the distance measuring sensor 1 may amplify the signal, using a small amount of charges, and the distance measuring sensor 1 may perform not only the short distance measuring but also the long distance measuring, etc. Accordingly, it is possible to provide a distance measuring sensor in which the image quality is enhanced and the complexity is improved (e.g., the complexity of the distance measuring sensor is reduced, etc.).

Figure 8:
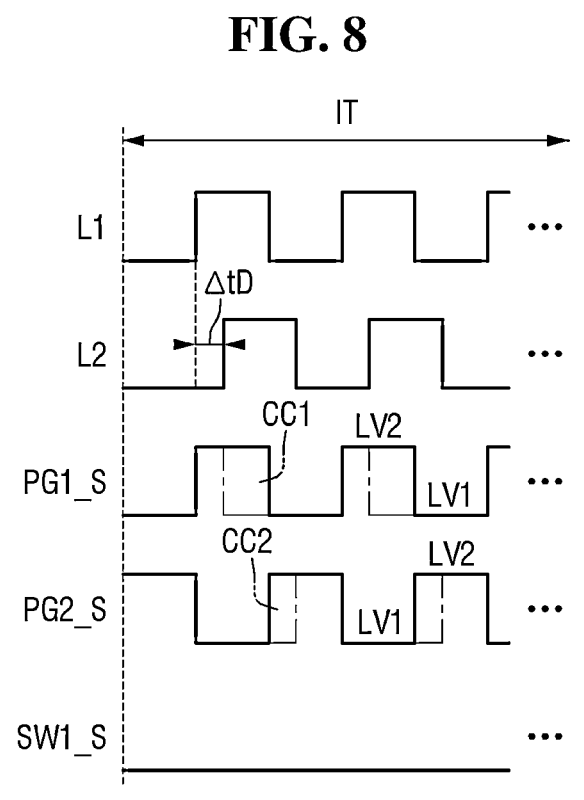
Figure 9:
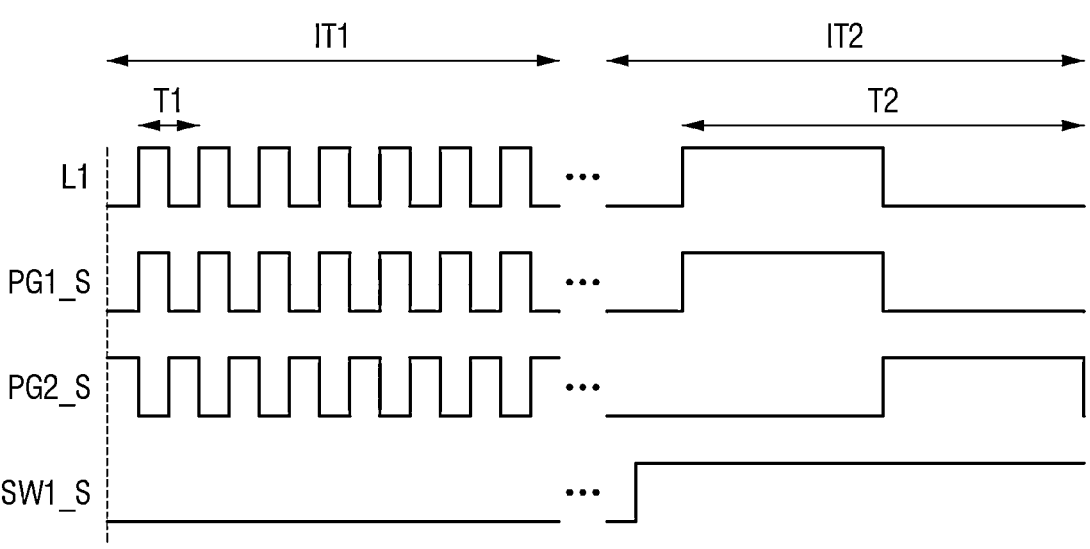

FIGS. 8 and 9 are timing diagrams showing the signal for driving the first pixel region according to some example embodiments.

Referring to FIGS. 1,3 and 8, the light output unit 400 of the distance measuring sensor 1 irradiates the object O with the first optical signal L1. The first optical signal L1 irradiated to the object O and reflected is provided to the pixel array 10 of the image sensor 90 as the second optical signal L2. At this time, an interval at which the pixel array 10 receives the second optical signal L2 is defined as a sensing interval IT (e.g., a sensing time period, etc.). Further, the signal provided to the first photo gate PG1 is defined as a first signal PG1_S, the signal provided to the second photo gate PG2 is defined as a second signal PG2_S, and the signal provided to the first switch SW1 is defined as a first switch signal SW1_S.

During the sensing interval IT, the light output unit 400 may output the first optical signal L1. The first optical signal L1 may be a pulse signal whose signal intensity changes. For example, the first optical signal L1 may be an optical signal that is repeatedly turned on and off, but is not limited thereto. During the sensing interval IT, the pixel array 10 may receive the second optical signal L2. The second optical signal L2 may be the first optical signal L1 delayed by a first delay time ΔtD, but is not limited thereto. The first delay time ΔtD may correspond to the time of flight (ToF) of light, e.g., the amount of time taken for the first optical signal L1 to reach the object O, and be reflected (e.g., return) to the pixel array 10, etc. Although the first optical signal L1 and the second optical signal L2 are shown to have a square wave in the drawing, the example embodiments are not limited thereto. For example, the first optical signal L1 and the second optical signal L2 may be sine waves, etc. Although the first optical signal L1 and the second optical signal L2 are shown to have the same amplitude in the drawings, the example embodiments are not limited thereto. Needless to say, the first optical signal L1 and the second optical signal L2 may have different amplitudes and/or may have a DC offset value, etc.

During the sensing interval IT, the timing generator 20 generates the first signal PG1_S having the same phase as the first optical signal L1 based on, corresponding to, and/or by the use of information of the first optical signal L1, and may provide the generated first signal PG1_S to the first photo gate PG1. Further, the timing generator 20 generates a second signal PG2_S having a phase opposite to that of the first optical signal L1 based on, corresponding to, and/or by the use of information of the first optical signal L1, and may provide the generated second signal PG2_S to the second photo gate PG2. Therefore, a phase difference between the first signal PG1_S and the second signal PG2_S may be 180 degrees. For example, when the first signal PG1_S is a logic low level LV1, the second signal PG2_S may be a logic high level LV2, etc. Further, when the first signal PG1_S is the logic high level LV2, the second signal PG2_S may be the logic low level LV1, etc.

When the signals provided to the first photo gate PG1 and the second photo gate PG2 are logic high level LV2, the charge collection region 120 converts the optical signal into the electrical signal. In other words, when the first signal PG1_S provided to the first photo gate PG1 is at the logic high level LV2 and the second optical signal L2 is received by the pixel array 10, the charge collection region 120 may generate charges corresponding to and/or based on the second optical signal L2, etc. Additionally, the amount of charges generated by the charge collection region 120 may correspond to a first charge generation interval CC1, etc. Similarly, when the second signal PG2_S provided to the second photo gate PG2 is at the logic high level LV2, the charge collection region 120 may receive the second optical signal L2 and generate charges corresponding to and/or based on the second optical signal L2, etc. In other words, when the second signal PG2_S provided to the second photo gate PG2 is at the logic high level LV2 and the second optical signal L2 is received by the pixel array 10, the charge collection region 120 may generate the charges, etc. That is, the amount of charges generated by the charge collection region 120 may correspond to a second charge generation interval CC2.

During the sensing interval IT, the first switch signal SW1_S may correspond to a logic low level, but is not limited thereto. That is, the first switch SW1 may be turned off. The image sensing method performed during the sensing interval IT may correspond to a short distance image sensing method and/or a medium distance image sensing method, etc. That is, the variable voltage VV is not applied to the photo diode PD during the sensing interval IT. Therefore, the charges generated from the photo diode PD are not amplified.

Referring to FIGS. 1, 3, 6 and 9, the distance measuring sensor 1 may perform the short distance image sensing and/or the medium distance image sensing during the first sensing interval IT1, and the distance measuring sensor 1 may perform the long distance image sensing during the second sensing interval IT2, but the example embodiments are not limited thereto. That is, the operations of S201 and/or S211 may be performed during the first sensing interval IT1, and the operations of S213 may be performed during the second sensing interval IT2, but are not limited thereto, and for example, the order of the operations may be changed, e.g., the long distance image sensing may be performed during the first sensing interval IT1, and the short distance image sensing and/or the medium distance image sensing may be performed during the second sensing interval IT2, and/or some sensing operations may be repeated and/or omitted, etc.

A first period T1 of the first optical signal L1 during the first sensing interval IT1 may be smaller than a second period T2 of the second optical signal L2 during the second sensing interval IT2, but the example embodiments are not limited thereto. That is, a time interval, duty cycle, and/or time period at which the first optical signal L1 is at the logic high level during the second sensing interval IT2 may be larger than a time interval, duty cycle, and/or time period, at which the first optical signal L1 is at the logic low level during the first sensing interval IT1. However, the example embodiments of the inventive concepts are not limited thereto.

Although the first switch signal SW1_S may be at the logic low level during the first sensing interval IT1, the first switch signal SW1_S may be at the logic high level during the second sensing interval IT2, but are not limited thereto. Accordingly, the variable voltage VV is applied to one end (e.g., the first end) of the photo diode PD during the second sensing interval IT2, and the charges generated from the photo diode PD may be amplified, etc. The distance measuring sensor 1 may convert the charges amplified during the second sensing interval IT2 into an output voltage. The distance measuring sensor 1 may sense the amplified charges obtained by converting the photons reflected from the object O located at a long distance (e.g., >=10 m, etc.).

The second sensing interval IT2 may be shorter than the first sensing interval IT1, but the example embodiments are not limited thereto. At the second sensing interval IT2 in which long distance image sensing is performed, because the distance measuring sensor 1 uses the amplified charges, the distance may be measured using a smaller and/or reduced number of times of image sensing. Therefore, the second sensing interval IT2 of the first and second photo gates PG1 and PG2 may be shorter than the first sensing interval IT1. Accordingly, it is possible to provide a more efficient and/or faster distance measuring sensor 1, etc.

Figure 10:
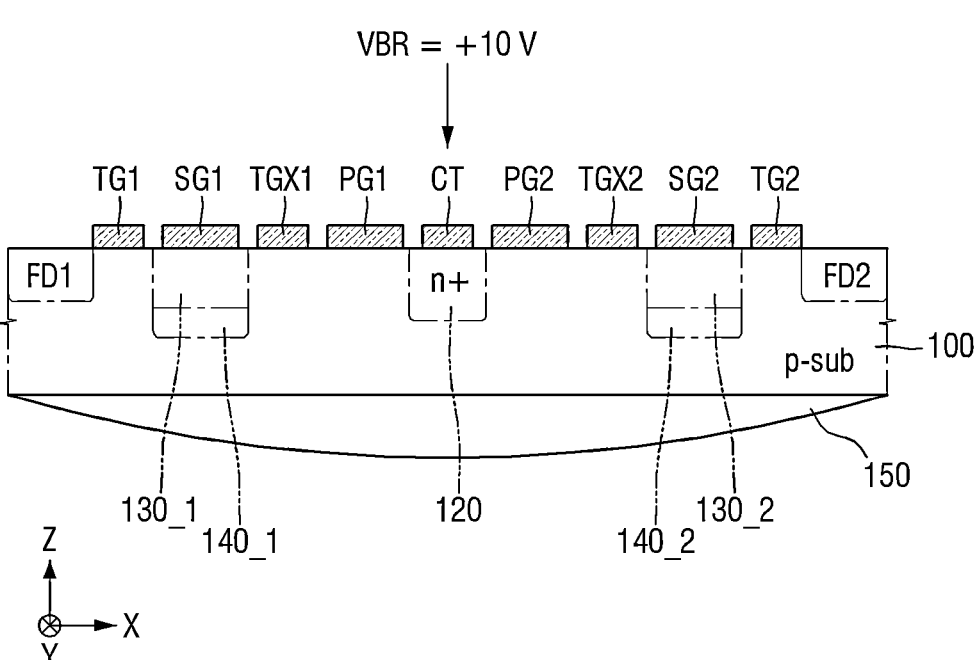
FIG. 10 is a cross-sectional view of a first pixel region according to some example embodiments.

FIG. 10 is a cross-sectional view of a first pixel region according to some example embodiments.

Referring to FIGS. 3 and 10, the substrate 100 may be doped with p-type impurities, and the charge collection region 120 may be doped with n-type impurities, etc. As a result, a pn junction may be formed between the substrate 100, the charge collection region 120. At this time, a ground voltage GND or a negative voltage may be applied to the substrate 100.

In the case of the long distance image sensing, as the first switch SW1 is turned on, the breakdown voltage VBR may be applied to the charge collection region 120. At this time, the breakdown voltage VBR may be a positive voltage. For example, a voltage level of the breakdown voltage VBR may correspond to, e.g., +10V, but is not limited thereto. As a result, a voltage of +10V may be applied to end of the charge collection region 120, and the charges generated from the photo diode PD may be amplified by the occurrence of avalanche breakdown.

Figure 11:
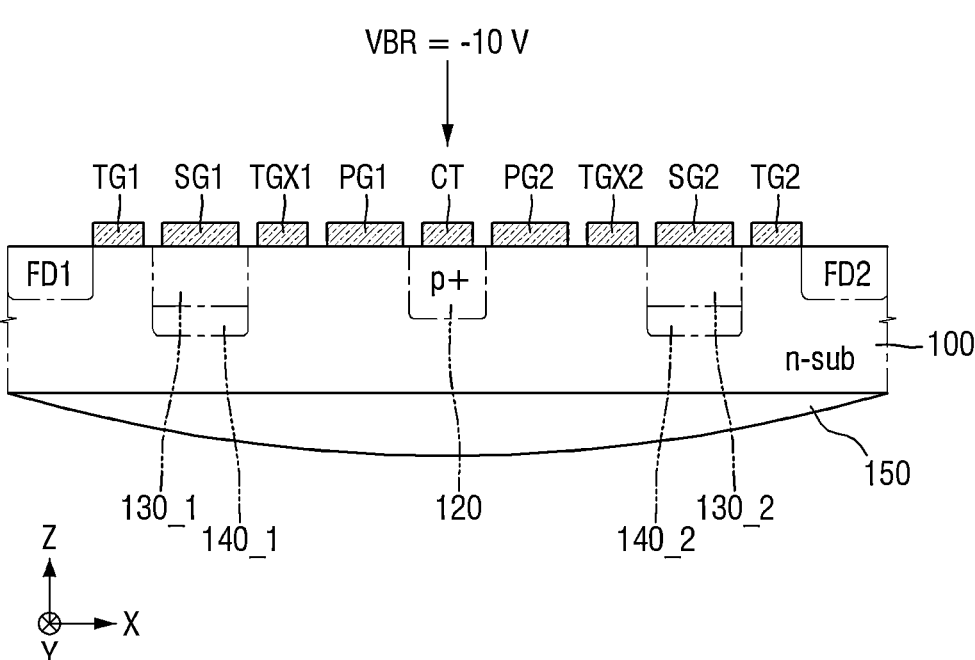
FIG. 11 is a cross-sectional view of a first pixel region according to some example embodiments.

FIG. 11 is a cross-sectional view of a first pixel region according to some example embodiments.

Referring to FIGS. 3 and 11, the substrate 100 may be doped with n-type impurities, and the charge collection region 120 may be doped with p-type impurities, but the example embodiments are not limited thereto. Accordingly, a pn junction may be formed between the substrate 100, the charge collection region 120. At this time, a ground voltage GND or a positive voltage may be applied to the substrate 100, etc.

In the case of the long distance image sensing, as the first switch SW1 is turned on, the breakdown voltage VBR may be applied to the charge collection region 120. At this time, the breakdown voltage VBR may be a negative voltage. For example, the voltage level of the breakdown voltage VBR may correspond to, e.g., −10V, but is not limited thereto. As a result, a voltage of −10V may be applied to end of the charge collection region 120, and the charges generated from the photo diode PD may be amplified by the occurrence of avalanche breakdown.

Hereinafter, the first pixel region P(i, j) according to some other example embodiments will be described referring to FIGS. 12 to 14.

Figure 12:
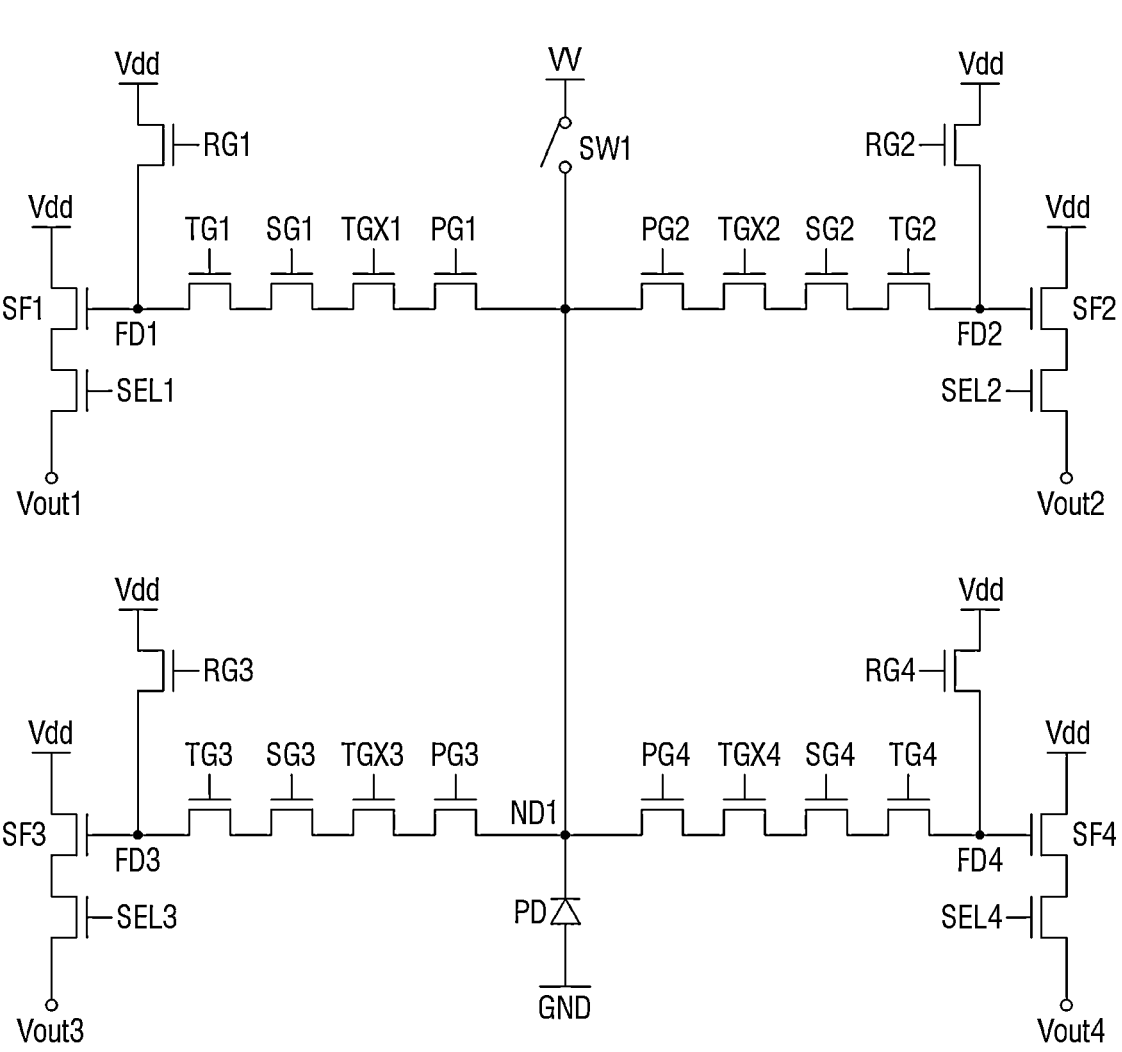
FIG. 12 is an equivalent circuit diagram of the first pixel region according to some example embodiments.

FIG. 12 is an equivalent circuit diagram of the first pixel region according to some example embodiments. FIG. 13 is a timing diagram explaining the signal which drives the first pixel region according to some example embodiments. FIG. 14 is a layout diagram of the first pixel region according to some example embodiments. For the sake of clarity and brevity, repeated description of components explained in reference to FIGS. 1 to 11 will be briefly described or omitted.

Figure 13:
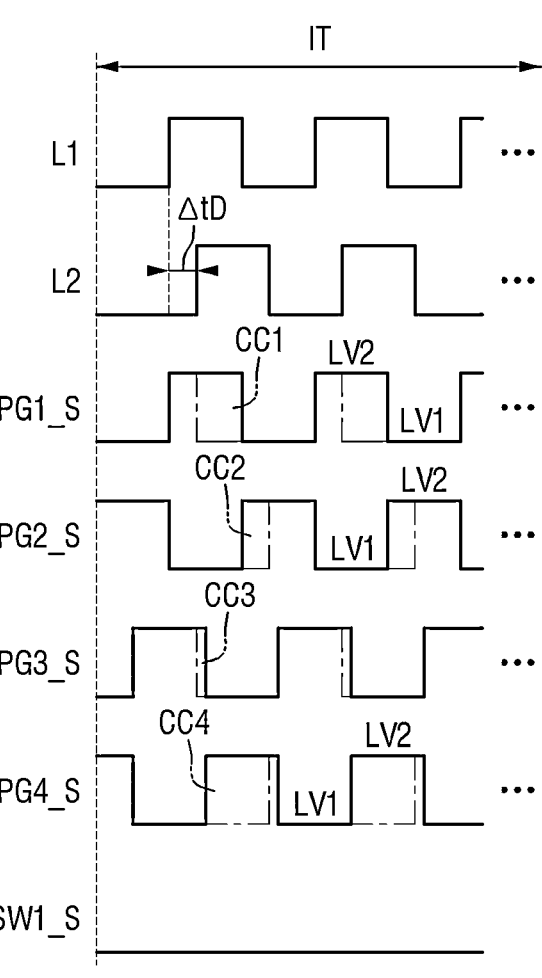
FIG. 13 is a timing diagram explaining the signal which drives the first pixel region according to some example embodiments.
Figure 14:
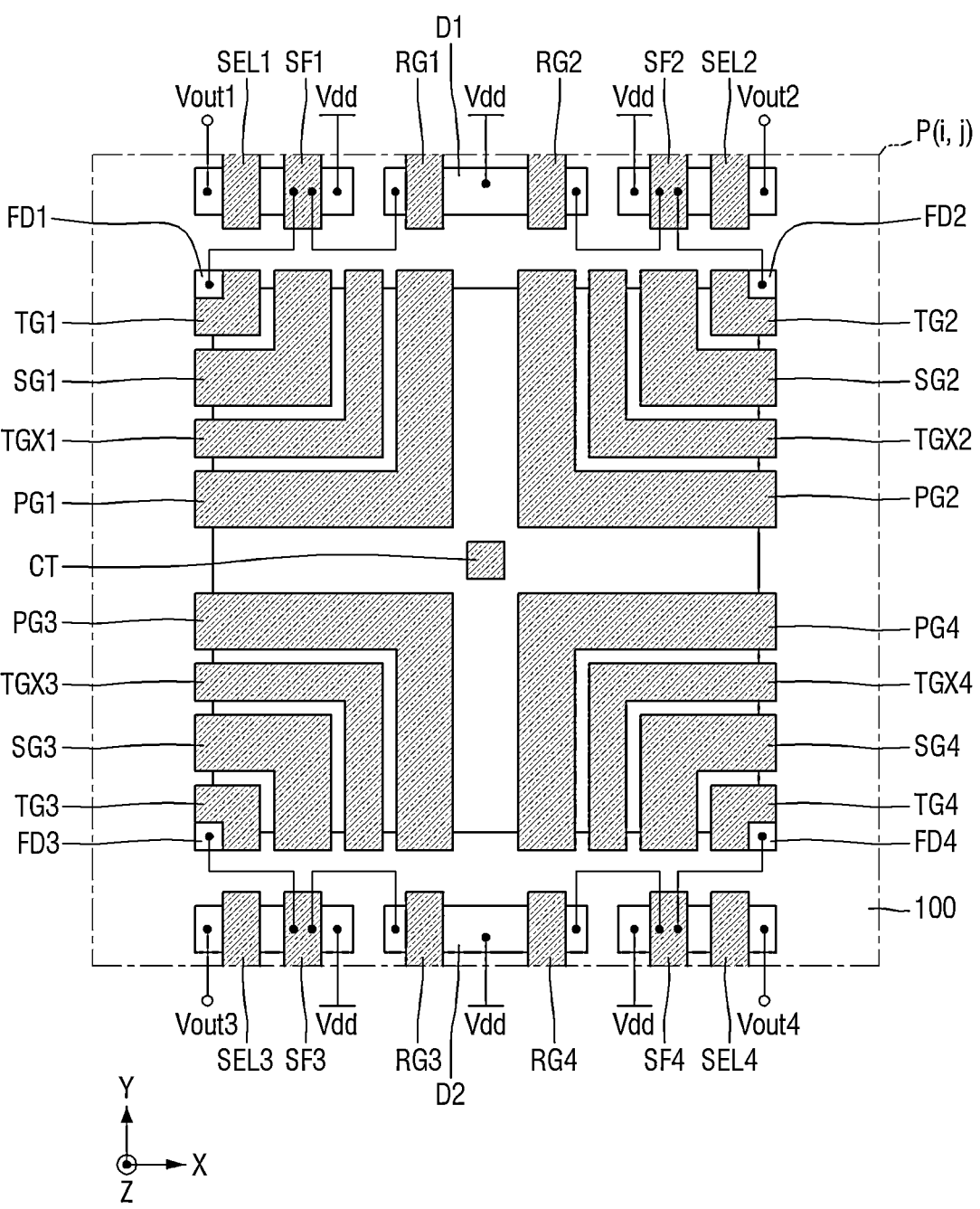
FIG. 14 is a layout diagram of the first pixel region according to some example embodiments.

Referring to FIGS. 12 to 14, the first pixel region P(i, j) according to some example embodiments may include a substrate 100, a first photo gate PG1, a second photo gate PG2, a third photo gate PG3, a fourth photo gate PG4, a first collected charge transfer gate TGX1, a second collected charge transfer gate TGX2, a third collected charge transfer gate TGX3, a fourth collected charge transfer gate TGX4, a first storage gate SG1, a second storage gate SG2, a third storage gate SG3, a fourth storage gate SG4, a first transfer gate TG1, a second transfer gate TG2, a third transfer gate TG3, a fourth transfer gate TG4, a first reset gate RG1, a second reset gate RG2, a third reset gate RG3, a fourth reset gate RG4, a first source follower gate SF1, a second source follower gate SF2, a third source follower gate SF3, a fourth source follower gate SF4, a first selection gate SEL1, a second selection gate SEL2, a third selection gate SEL3, a fourth selection gate SEL4, and/or a first switch SW1, etc., but the example embodiments are not limited thereto.

A first signal PG1_S, a second signal PG2_S, a third signal PG3_S, and/or a fourth signal PG4_S, etc., may be provided to each of the first photo gate PG1, the second photo gate PG2, the third photo gate PG3, and/or the fourth photo gate PG4, etc., respectively. For example, the timing generator 20 may generate the first signal PG1_S having the same phase as the first optical signal L1, the second signal PG2_S having the phase opposite to the first optical signal L1, the third signal PG3_S having a phase difference of 90 degrees from the first optical signal L1, and/or the fourth signal PG4_S having a phase difference of 270 degrees from the first optical signal L1, etc., based on, corresponding to, and/or by the use of the information of the first optical signal L1, but the example embodiments are not limited thereto. The timing generator 20 may provide the first signal PG1_S to the fourth signal PG4_S to each of the first photo gate PG1 to the fourth photo gate PG4, respectively. At this time, the amount of charges generated in the lower part of each of the first photo gate PG1 to the fourth photo gate PG4 may correspond to the first charge generation interval CC1, the second charge generation interval CC2, the third charge generation interval CC3, and the fourth charge generation interval CC4, etc.

The first photo gate PG1, the second photo gate PG2, the third photo gate PG3, and the fourth photo gate PG4 are separated from each other, and may each extend in the first direction X and the second direction Y, but are not limited thereto. For example, the first photo gate PG1 and the second photo gate PG2 may be separated in the first direction X, etc. Further, the third photo gate PG3 and the fourth photo gate PG4 may be separated from each other in the first direction X, but are not limited thereto. Further, the first photo gate PG1 and the third photo gate PG3 may be separated from each other in the second direction Y, etc. Further, the second photo gate PG2 and the fourth photo gate PG4 may be separated from each other in the second direction Y, but are not limited thereto.

The contact CT may be disposed between the first photo gate PG1, the second photo gate PG2, the third photo gate PG3, and the fourth photo gate PG4, but is not limited thereto. The first switch SW1 may be connected to the photo diode PD formed in the substrate 100 through the contact CT and provide a variable voltage VV to one terminal of the photo diode PD formed in the substrate 100 through the contact CT. A power supply voltage Vdd may be applied to each of the first drain region D1 and the second drain region D2, etc.

The charges provided to the third floating diffusion region FD3 may be output as a third output voltage Vout3 through the third source follower gate SF3 and the third selection gate SEL3, but is not limited thereto. The third reset gate RG3 may reset the third floating diffusion region FD3 using the power supply voltage Vdd. The charges provided to the fourth floating diffusion region FD4 may be output as the fourth output voltage Vout4 through the fourth source follower gate SF4 and the fourth selection gate SEL4, etc. The fourth reset gate RG4 may reset the fourth floating diffusion region FD4 using the power supply voltage Vdd.

Hereinafter, the distance measuring sensor 1 according to some other example embodiments will be described referring to FIG. 15.

Figure 15:
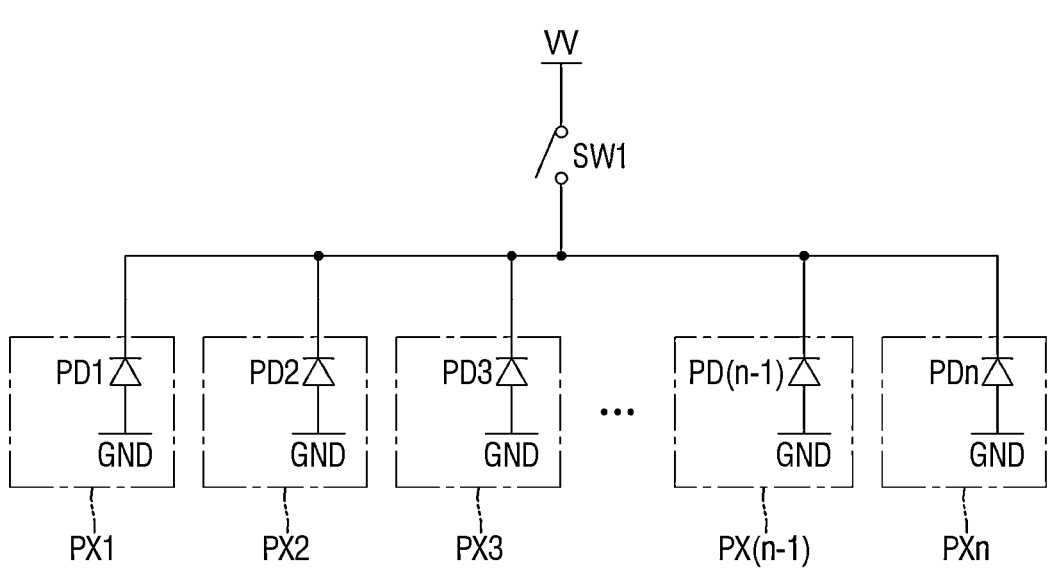
FIG. 15 is an equivalent circuit diagram of the distance measuring sensor according to some example embodiments.

FIG. 15 is an equivalent circuit diagram of the distance measuring sensor according to some example embodiments. For the sake of clarity and brevity, repeated discussion of components discussed in reference to FIGS. 1 to 14 will be briefly described or omitted.

Referring to FIG. 15, according to at least one example embodiment, the distance measuring sensor 1 may include a plurality of pixels, e.g., first pixel to nth pixels PX1 to PXn, a first switch SW1, and/or a variable voltage VV (e.g., a variable voltage generator, a variable voltage source, etc), but is not limited thereto. The first switch SW1 may connect the variable voltage VV to the plurality of pixels, e.g., first pixel to the nth pixels PX1 to PXn.

The first pixel to the nth pixels PX1 to PXn may correspond to distance measuring pixels, respectively. For example, the first pixel PX1 may include a plurality of photo gates connected to the first photo diode PD1, etc. Signals having different phases from each other may be provided to the plurality of photo gates.

The first to nth photo diodes PD1 to PDn of the first pixel to the nth pixels PX1 to PXn may all be connected to the first switch SW1. When the first switch SW1 is turned off, no voltage is applied to the first to nth photo diodes PD1 to PDn, e.g., from the variable voltage VV. In this case, the distance measuring sensor 1 may perform the short distance image sensing and/or the medium distance image sensing. When the first switch SW1 is turned on, the variable voltage VV may be applied to the first to nth photo diodes PD1 to PDn, etc. Accordingly, the amount of charges output from the first to nth photo diodes PD1 to PDn may be amplified, and the distance measuring sensor 1 may perform long distance image sensing.

The first pixel to the nth pixels PX1 to PXn may be placed on the first substrate, and the voltage source which provides the variable voltage VV may be placed on the second substrate below the first substrate, but the example embodiments are not limited thereto. That is, the first pixel to the nth pixels PX1 to PXn and the voltage source which provides the variable voltage VV may be placed separately, but are not limited thereto.

In concluding the detailed description, persons of ordinary skill in the art will appreciate that many variations and modifications may be made to the example embodiments without substantially departing from the principles of the inventive concepts. Therefore, the disclosed example embodiments of the inventive concepts are used in a generic and descriptive sense only and not for purposes of limitation.

What is claimed is:

1. A distance measuring sensor comprising:
a light emitter configured to output a first optical signal;

a pixel array configured to receive a second optical signal caused by reflection of the first optical signal from an object;
processing circuitry configured to calculate a distance between the light emitter and the object based on an output of the pixel array; and
a variable voltage source, and
the pixel array includes,
a photo diode including a first end connected to a ground voltage and a second end connected to a first node, and
a first photo gate and a second photo gate, each connected to the first node, and
the processing circuitry is further configured to,
control the variable voltage source to apply a first voltage to the first node and control the light emitter to output the first optical signal for a first period in response to the calculated distance between the light emitter and the object being larger than a first threshold distance, and
control the variable voltage source to apply no voltage to the first node and control the light emitter to output the first optical signal for a second period in response to the calculated distance between the light emitter and the object being smaller than the first threshold distance,
wherein the first period is longer than the second period.

2. The distance measuring sensor of claim 1, wherein the processing circuitry is further configured to:
set a sensing interval of the pixel array for sensing the second optical signal to a first sensing interval in response to the calculated distance between the light emitter and the object being larger than the first threshold distance; and
set the sensing interval of the pixel array for sending the second optical signal to a second sensing interval in response to the calculated distance between the light emitter and the object being smaller larger than the first threshold distance; and
the first sensing interval is smaller than the second sensing interval.

3. The distance measuring sensor of claim 1, wherein the pixel array is further configured to:
output a first charge amount in response to the first voltage being applied to the first node;
output a second charge amount in response to the voltage not being applied to the first node; and
the first charge amount is larger than the second charge amount.

4. The distance measuring sensor of claim 1, wherein the processing circuitry is further configured to:
set a phase of a first gate signal applied to the first photo gate to be the same as a phase of the first optical signal; and
set a phase of a second gate signal applied to the second photo gate to have a phase difference of 90 degrees from the first gate signal.

5. The distance measuring sensor of claim 1, wherein
the pixel array further includes a third photo gate and a fourth photo gate, each connected to the first node; and
the processing circuitry is further configured to,
set a phase of a first gate signal applied to the first photo gate to be the same as a phase of the first optical signal,
set a phase of a second gate signal applied to the second photo gate to have a phase difference of 90 degrees from the first gate signal, set a phase of a third gate signal applied to the third photo gate to have a phase difference of 90 degrees from the second gate signal, and set a phase of a fourth gate signal applied to the fourth photo gate to have a phase difference of 90 degrees from the third gate signal.

6. The distance measuring sensor of claim 1, wherein the first voltage has a level that is greater than +10V or less than −10V.

7. The distance measuring sensor of claim 1, wherein the variable voltage source is separate from the pixel array.

8. The distance measuring sensor of claim 1, wherein the variable voltage source is included in the pixel array.

9. An image sensor comprising:

a first pixel which includes a plurality of first photo gates and a plurality of first photo diodes below the plurality of first photo gates;

a second pixel which includes a plurality of second photo gates and a plurality of second photo diodes below the plurality of second photo gates;

a light emitter;

processing circuitry; and a switch which is separated from the first and second pixels and connected between the first and second photo diodes and a voltage source, and the switch being configured to, apply a voltage to the first and second photo diodes in a first switch mode, and not apply a voltage to the first and second photo diodes in a second switch mode; and the first and second photo diodes are configured to output a larger amount of charges in response to the applied voltage than in response to no applied voltage, wherein the processing circuitry is configured to calculate a distance between the light emitter and an object;

control the light emitter to output a first optical signal for a first period in response to the calculated distance between the light emitter and the object being larger than a first threshold distance, and control the light emitter to output the first optical signal for a second period in response to the calculated distance between the light emitter and the object being smaller than the first threshold distance, and wherein the first period is longer than the second period.

10. The image sensor of claim 9, wherein the first and second pixels are on a first substrate; and the voltage source is on a second substrate below the first substrate.

11. The image sensor of claim 9, wherein the first and second pixels are configured to operate simultaneously based on a voltage output by the switch.

12. The image sensor of claim 9, wherein the first and second pixels are configured to:

operate using a first sensing interval in response to the switch being turned off; and operate using a second sensing interval in response to the switch being turned on, and the first sensing interval is larger than the second sensing interval.

13. The image sensor of claim 9, further comprising:

processing circuitry connected to the first pixel and the second pixel, and the processing circuitry is configured to, calculate the distance based on signals output from the first pixel and the second pixel; and determine whether the calculated distance corresponds to a first distance imaging mode or a second distance imaging mode, the first distance imaging mode corresponding to a farther distance than the second distance imaging mode.

14. The image sensor of claim 9, wherein the voltage source is configured to output a voltage having a level greater than +10V or less than −10V.

15. A distance measuring sensor comprising:

a light emitter configured to output a first optical signal;

a pixel array configured to receive a second optical signal caused by reflection of the first optical signal from an object;

processing circuitry configured to calculate a distance between the light emitter and the object from an output of the pixel array;

control the light emitter to output the first optical signal for a first period in response to the calculated distance between the light emitter and the object being larger than a first threshold distance, and control the light emitter to output the first optical signal for a second period in response to the calculated distance between the light emitter and the object being smaller than the first threshold distance; and a variable voltage source, wherein the first period is longer than the second period, wherein the pixel array includes, a photoelectric conversion unit that includes a substrate and a doping region, the substrate being doped with a first impurity and which has a ground voltage, and the doping region being doped with a second impurity different from the first impurity, and the photoelectric conversion unit is configured to convert the second optical signal into an electric signal, and a photo gate on the doping region and connected to the doping region, wherein the processing circuitry is configured to determine whether the calculated distance corresponds to a first distance mode or a second distance mode, wherein the second distance mode corresponds to a second distance farther away than a first distance, control the variable voltage source to apply a first voltage to the doping region in the first distance mode, and control the variable voltage source to apply a second voltage to the doping region in the second distance mode, the second voltage having a higher level than the first voltage.

16. The distance measuring sensor of claim 15, wherein the first impurity is a p-type impurity;

the second impurity is an n-type impurity; and the first and second voltages have a positive level.

17. The distance measuring sensor of claim 15, wherein the first impurity is an n-type impurity;

the second impurity is a p-type impurity; and the first and second voltages have a negative level.

18. The distance measuring sensor of claim 15, wherein the processing circuitry is further configured to control the variable voltage source to apply no voltage to the doping region in a third distance mode.

19. The distance measuring sensor of claim 18, wherein the processing circuitry is further configured to determine whether the calculated distance corresponds to the third distance mode, and the third distance mode corresponds to a shorter distance than the first distance and second distance.

* * * * *